Dec. 4, 1962   J. W. GOTTESMAN   3,066,808
AUTOMOBILE PARKING GARAGE
Filed Jan. 29, 1960

INVENTOR.
JEROME W. GOTTESMAN
BY
Brumbaugh, Free, Graves & Donohue
his   ATTORNEYS.

United States Patent Office 3,066,808
Patented Dec. 4, 1962

3,066,808
AUTOMOBILE PARKING GARAGE
Jerome W. Gottesman, 329 Field Place, Hillside, N.J.
Filed Jan. 29, 1960, Ser. No. 5,454
1 Claim. (Cl. 214—16.1)

This invention relates to automobile parking garages that utilize narrow plots of land effectively for automobile storage.

Often only narrow lots on the order of twenty-five feet in width, with street frontage at one end, are available for parking automobiles in heavily developed urban centers. The various parking garages devised to fit such narrow lots have not been satisfactory because such structures relied on special automobile guides, complex shiftable automobile carriers and similar structures to park the automobiles. Regardless of any theoretical advantages provided by such complicated garages, none of them succeeded in practice for a number of reasons including the necessity of skilled operating personnel, their high initial cost and constant maintenance costs, and the inability of the complicated guide devices and carriages to accommodate a sufficient size range of automobiles.

Difficulties have also been encountered in the movement of automobiles in and out of stalls in narrow garages without excessive shifting of the automobiles in storage. Moreover, there should be some provision in such garages for rotating the automobiles so that many of them may be driven both in and out of the building in a forward direction.

The present invention overcomes the above-described difficulties by providing a long and narrow garage building having a plurality of levels with two separate parking areas on each level. An elevator in a well between the two parking areas, extending the full width of the building, is vertically movable into juxtaposition with the two parking areas of each level to span three parking stalls on each side thereof.

A turntable with a diameter no longer than required to accommodate the wheel base of the largest automobile that the garage is designed to store is recessed in the elevator platform. When actuated, suitable mechanism rotates the turntable and automobile into optimum position for parking the vehicle in a selected stall. The turntable also rotates the automobile into an outwardly facing position so that it may be driven out of the garage in a forward direction.

Figure 1:
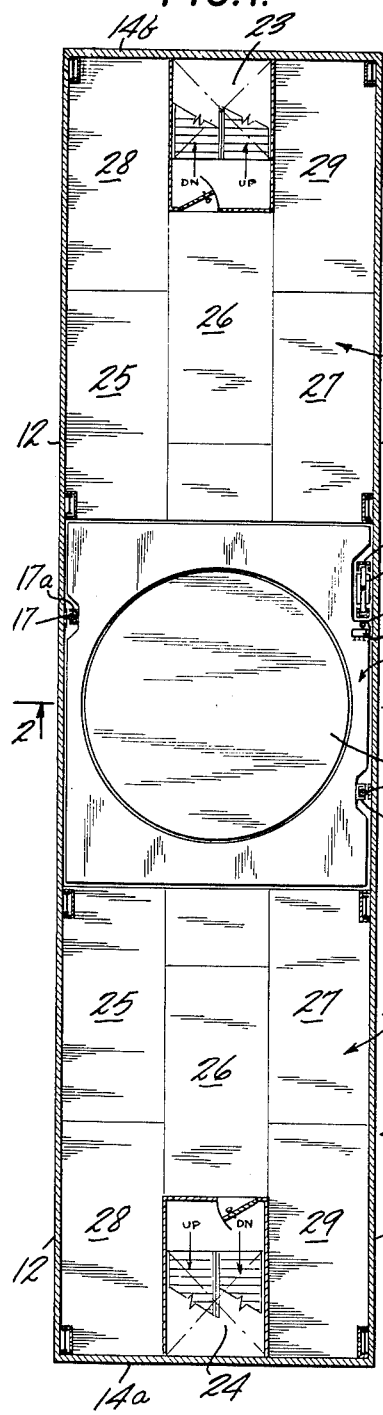
Figure 2:
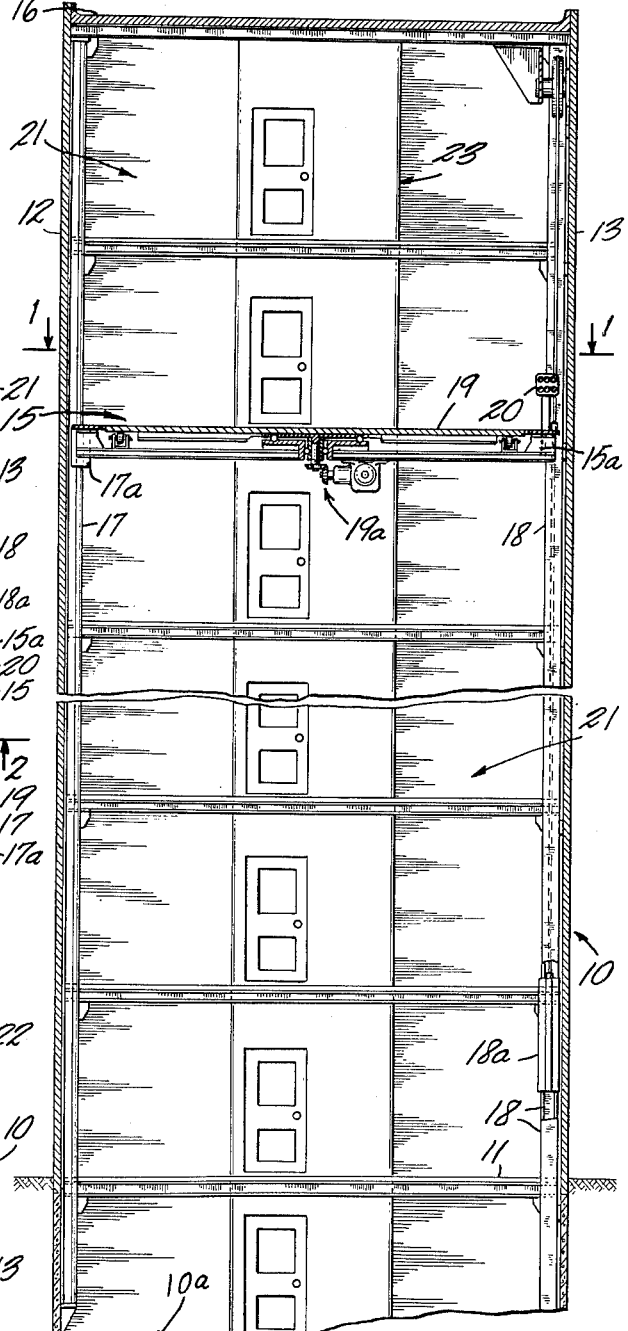

These and further advantages of the present invention will be more readily understood when the following description is read in connection with the accompanying drawings, in which:

FIGURE 1 is a cross section showing one parking level in a typical automobile parking garage constructed in accordance with the present invention; and FIGURE 2 is a cross section, partially broken away, of the garage shown in FIGURE 1 taken along the view line 2—2 looking in the direction of the arrows.

Referring to an illustrative embodiment of the invention in greater detail with reference to the drawings, an automobile parking garage 10 is built in accordance with conventional construction practices by erecting on a foundation 10a ground or main floor 11, suitable side walls 12 and 13, and front and rear walls 14a and 14b enclosed, if desired, by a roof 16. These components are supported in the usual manner by appropriate structural beams and braces. A suitable opening (not shown) is provided in the front wall 14a through which automobiles may be driven from the street to the main floor 11 on either side of the stairs 24, or also under the stairs if they do not extend to the main floor.

A centrally disposed elevator 15 in a well in the building 10 includes a platform 15a that extends between the building sides 12 and 13. Conventional guiding structures 17a and weights 18a guide and counterbalance the elevator 15 along offset guide rails 17 and offset counterbalance rails 18. Offsetting the rails in this manner from the elevator center line provides maximum usable width at the center of the elevator platform 15a. Any conventional hydraulic or electrical drive, for example, may be used to raise and lower the elevator 15 into juxtaposition with the parking levels in the building 10.

Recessed in the elevator platform 15a and flush therewith is a flat surfaced turntable 19 rotatable both continuously and to preset positions by a conventional motor drive system, indicated generally at 19a, energized in response to actuation of control switches mounted on a panel 20 at a suitable position on the elevator platform 15a. Vertical movement of the elevator 15 is regulated by suitable controls preferably located on the panel 20.

Each of a plurality of parking levels, vertically spaced in the building 10, includes two separate parking areas 21 and 22 on suitable flooring with which the elevator 15 may be moved into juxtaposition, as shown in FIGURE 1. In accordance with usual building ordinances, stairwells 23 and 24 are provided at the ends of the building extending through the parking areas as shown.

To provide maximum utilization of the parking areas 21 and 22, three forward stalls 25, 26 and 27, between the walls 12 and 13, are spanned by the elevator 15, the stall 26 being located a few feet away from the elevator platform 15a to facilitate parking of the automobiles in the remaining stalls, as explained hereinafter. Located behind the stalls 25 and 27 are further stalls 28 and 29 on either side of the stairwells 23 and 24.

It is important to correlate with the automobiles to be parked the size of the elevator, turntable and storage stalls. In particular, the turntable 19 has a diameter no longer than a distance that is slightly in excess of the diagonal measurement between opposite front and rear wheels, hereinafter referred to as the diagonal wheel base, of the longest wheel base automobile to be accommodated and the interior dimension of the building 10 between the side walls 12 and 13 must be slightly in excess of the longest overall length automobile normally parked. With present day automobiles, a lot twenty-five feet wide will provide a clear distance at the center of the elevator between the walls 12 and 13 in excess of twenty-three feet which is more than enough to accommodate most automobiles. In practice, the great majority of automobiles may actually be rotated in a twenty-one foot space, but since the inventive garage uses no fixed vehicle guides, which in the past have proven wholly impractical, a twenty-three foot width compensates for errors in judgment in centering automobiles on the turntable 19.

In operation, an automobile is driven from the street into the garage 10 and centered on the turntable 19. The elevator operator then closes a switch on the control panel 20 to cause the elevator 15 to ascend vertically into juxtaposition with the parking areas 21 and 22 at a desired parking level. If it is assumed that spaces 25, 26 and 28 in the area 21 are occupied, the operator actuates another switch on the control panel 20 to rotate the turntable 19 automatically in a clock-wise direction a few degrees to a preset position providing an optimum angle of approach to parking stalls 27 and 29. The automobile may then be driven directly from the turntable across the stall 27 into the stall 29. The recessed location of the stall 26, as well as the proper angle provided by the turntable 19, facilitates this parking operation.

In the event an automobile has been parked improperly in the stall 26 and a slightly different angle of approach would facilitate parking, another switch on the panel 20 may be operated to rotate the turntable 19 to a desired position. Preferably a pair of switches provide continuous clockwise and counter-clockwise turntable rotation.

If the automobile were to be parked in the area 22, the turntable 19 may be rotated to reverse the direction of the automobile as the elevator 15 ascends to the selected level. It may then be driven forwardly into a desired stall on the area 22.

To deliver an unblocked automobile, it is driven from its stall and centered on the turntable 19 which may then be rotated, as the elevator is descending, so that the automobile faces the front wall 14 and the street. Rotation of the automobile on the turntable 19 is facilitated by the offset guides 17 and 18, which provide maximum usable width across the center of the elevator platform 15a. Accordingly, when the elevator reaches the main floor 11, the automobile is ready to be driven in a forward direction out of the garage 10.

If an automobile must be delivered from the back stall 28 in the area 22 while blocked by a loaded front stall 25, the operator has two choices. The blocking automobile may be transferred to a vacant stall, if available, in the area 21. If the area 21 is full and there are no vacant stalls in the area 22 to which the blocking automobile may be transferred from the stall 25, the blocking automobile is driven across the center of the turntable 19 and rotated to a position parallel to the sides of the building. The automobile in the stall 28 may then be moved to the elevator platform 15a alongside and now parallel vehicle from the stall 25 and the elevator lowered with both vehicles. After driving the stall 28 automobile off the elevator 15 on the ground floor, the stall 25 automobile may be returned to one of the stalls 25 or 28, or any other suitable location, alone or with one or two other automobiles that are to be parked.

It is apparent from the foregoing that the inventive garage provides maximum automobile storage facilities for narrow lots without the use of special purpose automobile guiding structures and complex machinery requiring the services of skilled personnel for proper operation. It will be understood that the above-described embodiment of the invention is illustrative only and modifications thereof will occur to those skilled in the art. Therefore, the invention is not to be limited to the specific apparatus disclosed herein but is to be defined by the appended claim.

I claim:

An automobile parking garage for narrow lots comprising a building with side walls several times longer than its end walls, a plurality of parking levels in the building to store automobiles, each level including two parking areas separated by an elevator well in the center of the building, an elevator in the well having an unobstructed flat platform extending between the sides of the building and vertically movable into juxtaposition with the two parking areas at each parking level, a flat surfaced turntable flush with the elevator platform and having a diameter no longer than a distance that is slightly in excess of the diagonal wheel base of the longest wheel base automobile normally to be accommodated in the garage, the diameter of the turntable being substantially less than the width of the parking areas, means to rotate the turntable to selected angular positions, each parking area including three forward stalls spanned by the elevator platform with the two outer forward stalls abutting the elevator platform and the middle forward stall positioned several feet distant from the elevator platform, a stall behind each of the side stalls, a well behind at least one of the middle stalls to provide an alternate means of access to all levels of the garage, and means to rotate the turntable to preset positions providing optimum angles of approach to the side stalls for automobiles on the turntable.

References Cited in the file of this patent

UNITED STATES PATENTS

| | | |
|---|---|---|
| 1,465,135 | Kehr | Aug. 14, 1923 |
| 1,772,532 | Albertoli | Aug. 12, 1930 |
| 1,779,998 | Beecher et al. | Oct. 28, 1930 |
| 2,785,809 | Riblet | Mar. 19, 1957 |